US008857717B2

(12) United States Patent
Ness

(10) Patent No.: US 8,857,717 B2
(45) Date of Patent: Oct. 14, 2014

(54) METHOD AND DEVICE FOR CHECKING AN ELECTRONIC PASSPORT

(75) Inventor: Werner Ness, Unterschleissheim (DE)

(73) Assignee: Giesecke & Devrient GmbH, München (DE)

( * ) Notice: Subject to any disclaimer, the term of this patent is extended or adjusted under 35 U.S.C. 154(b) by 1005 days.

(21) Appl. No.: 11/990,346

(22) PCT Filed: Aug. 9, 2006

(86) PCT No.: PCT/EP2006/007896
§ 371 (c)(1),
(2), (4) Date: Feb. 11, 2008

(87) PCT Pub. No.: WO2007/017275
PCT Pub. Date: Feb. 15, 2007

(65) Prior Publication Data

US 2009/0090777 A1 Apr. 9, 2009

(30) Foreign Application Priority Data

Aug. 11, 2005 (DE) ......................... 10 2005 038 092

(51) Int. Cl.
*G06K 7/06* (2006.01)
*G07C 9/00* (2006.01)

(52) U.S. Cl.
CPC ................................. *G07C 9/00087* (2013.01)
USPC ......................................................... 235/441

(58) Field of Classification Search
USPC ......................................................... 235/441
See application file for complete search history.

(56) References Cited

U.S. PATENT DOCUMENTS

| | | | | |
|---|---|---|---|---|
| 4,993,068 | A * | 2/1991 | Piosenka et al. | 713/186 |
| 7,272,721 | B1 | 9/2007 | Hellenthal | |
| 2003/0168514 | A1 | 9/2003 | Rancien et al. | |
| 2004/0006699 | A1 * | 1/2004 | von Mueller et al. | 713/185 |
| 2004/0149827 | A1 * | 8/2004 | Zuili | 235/439 |
| 2004/0233040 | A1 * | 11/2004 | Lane et al. | 340/5.86 |
| 2009/0043578 | A1 * | 2/2009 | Burke | 704/246 |

FOREIGN PATENT DOCUMENTS

| | | |
|---|---|---|
| DE | 199 61 403 C2 | 8/2001 |
| EP | 1 170 705 | 1/2002 |
| JP | 05-035935 | 2/1993 |
| NL | 1010443 | 5/2000 |
| WO | WO 2004/017265 | 2/2004 |

OTHER PUBLICATIONS

Abstract of Japanese Patent Publication No. 05-035935, Pub. Date: Feb. 12, 1993, Patent Abstracts of Japan.

* cited by examiner

*Primary Examiner* — Michael G Lee
*Assistant Examiner* — David Tardif
(74) *Attorney, Agent, or Firm* — Martine Penilla Group, LLP

(57) ABSTRACT

The invention relates to a method for performing machine checking of electronically-stored personal data in a passport booklet. The data are transmitted in an obscured form to a reader device after the passport has been presented to this reader device, and the accuracy of the obscuring is first verified and the obscuring is then removed. A positive signal is issued in the event of a successful verification. The recovered personal data are subsequently checked for authenticity. The verification and removal of the obscuring, as well as the authenticity check, ensue in a time-staggered manner after the passport booklet has been removed from the reader device by a verifying person in order to conduct further checks.

14 Claims, 3 Drawing Sheets

METHOD AND DEVICE FOR CHECKING AN ELECTRONIC PASSPORT

BACKGROUND OF THE INVENTION

The invention is based on an electronic passport as is described, for example, in US 2003/0168514 A1. The passport described therein possesses the format of a passport booklet into whose cover is inserted an RFID device with a chip to record data and an antenna as interface to the exterior world. The described passport may be machine-read without direct contact.

A method for fully automatic performance of specified checks may be taken from JP 05-035935 using a passport that contains non-volatile memory that may be read electronically. The check includes a comparison between image information taken of the passport holder and image information read from the passport. Based on checking information read from the non-volatile memory, the authenticity of the passport is further established. In connection with this check, checking information may also be recorded in the passport. The advantage to this procedure is that a human checker need not be present. However, the proposed steps cause a high degree of data-processing expense that acts against rapid performance.

EP 1 170 705 A2 discloses a fully automatic admission system that is particularly suited to processing of flight passengers, in which information from a passport booklet is used in order to first determine the identity of the traveler, and second to check the legitimacy of the passport. Personal identity checking is performed by means of a data-processing based comparison of a photograph of a traveler taken by an automatic camera to a photograph taken from the image in the passport. To check passport legitimacy, machine-readable data located in the passport are read and compared with a "black list." The proposed system obviates the physical presence of verifying personnel at an entry system. However, it operates relatively slowly due to the conversion of photographs to data, which is necessary twice, or requires a very high-performance, and thus expensive, data-processing system. Total removal of verifying personnel from the monitoring process is ever more undesirable for security reasons. This particularly applies for border crossings. The proposed system is not suited for an arrangement that includes the physical presence of a verifying person because of its relatively slow operating speed.

From DE 199 61 403 C2, a method is known for the monitoring of persons by means of checking an electronic entitlement passport in the form of a Smart Card that contains formal and biometric personal data. A person being checked with this system is directed through two corrals. In the first corral, the Smart Card and the personal data are checked for validity. In the second corral, biometric characteristics of the person that are the basis for the biometric data are checked. Verification of personal data occurs under cryptographic protection using so-called MACs (Message Authentication Code). The method allows accelerated automatic processing of checks of persons.

SUMMARY OF THE INVENTION

The steps to be performed for reading personal data from electronic passports are presently governed by established standards. According to these standards, the reading must be via a secured data connection. This is ensured by using the known technique of "secure messaging." Secure messaging is based on the use of so-called "session keys" that are negotiated at the beginning of a data transfer between the parties involved, in this case between a passport and a reader device. For additional securing of the data transfer by means of diversification, a send sequence counter SSC is provided in both the passport and the reader device that increases its count upon each exchanged data packet within a data transmission. Commands from the reader device and responses from the passport are obscured for data transmission via encryption by means of the session keys and the send sequence counter.

Usually it is also officially specified for electronically-readable passports that the correctness of performing the obscuring be checked within the reader device for responses delivered from a passport. This check may particularly be performed by means of the known concept of MACs (Message Authentication Code). For this, a passport creates a MAC each, the MAC covering an obscured response, and the MAC is transferred to the reader device along with the response. After receiving the response, the reader device also creates a MAC* covering the received obscured data, and compares it with the MAC transferred in the response of the passport.

Because of the protocols conventionally used for communication, and because of the limitations on data exchange between the reader device and passport imposed by the physical properties of the interface, data transfer from the passport to the reader device when reading the passport normally occurs packet for packet in several data packets. Each transferred data packet is checked for validity immediately upon reception by the reader device by means, e.g., of MAC comparison. When validity is established, the next data packet is requested from the passport. If an error occurs, the reading of the data from a passport is immediately terminated. The method is secure, but entails correspondingly long reading times.

It is an object of the invention to provide a method for checking an electronic passport that includes the involvement of a checking person and still may be carried out quickly.

This problem is solved by a method with the features of the main claim, and by a checking system with the features of the independent system claim.

The method according to the invention has an advantage that, when a passport is checked, both a check of electronic data and a visual check by checking personnel can be carried out with a processing time that is still acceptable. This is achieved in that the electronic data from the passport to be checked is only read out at first, with the actual checking of the correctness and authenticity of the data occurring downstream all while the visual inspection is performed by a person at the same time.

When the electronic data are read out from the passport, it is preferred that only a check of the read-out data for plausibility is performed. The check may particularly consist of a check as to whether certain syntactic conditions are met, or of a check for specific data quantities. An embodiment example of the invention will be described in greater detail in the following, having regard to the drawings.

BRIEF DESCRIPTION OF THE DRAWINGS

Additional features and advantages of the present invention will become apparent from the following description of an exemplary embodiment. Reference is made to the schematic drawings in which.

DETAILED DESCRIPTION OF EXEMPLARY EMBODIMENTS

Figure 1:
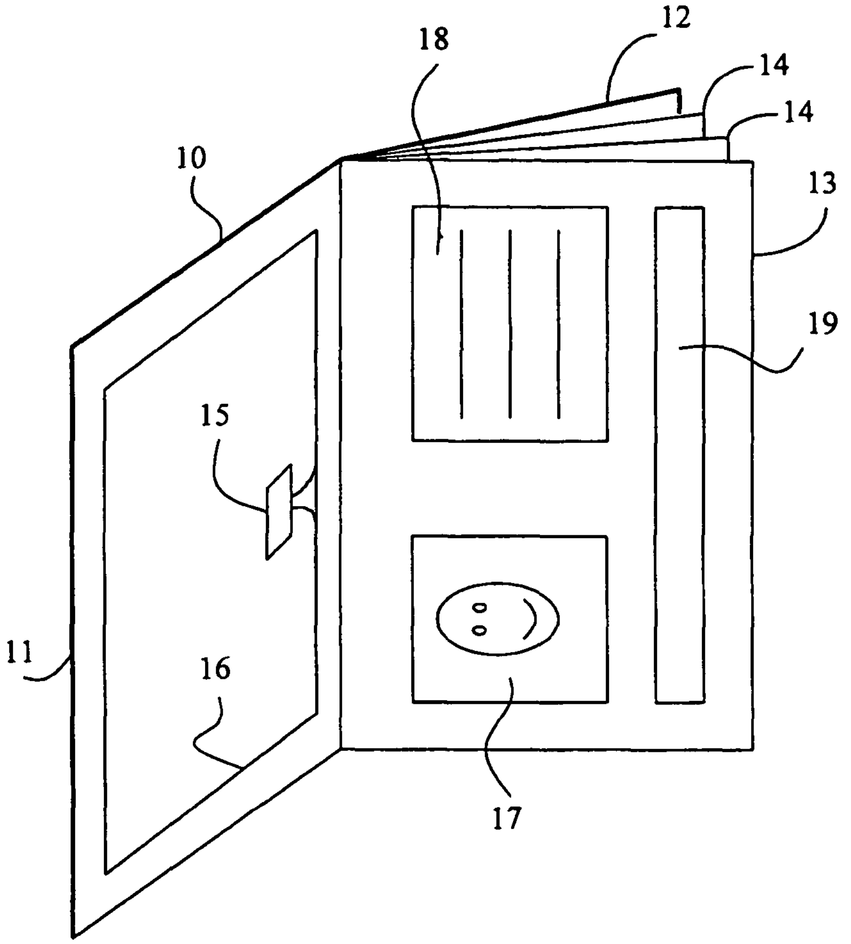
FIG. 1 shows the structure of an electronic passport.

FIG. 1 shows an electronic passport in the form of a passport booklet 10 consisting of a cover with two cover halves 11 and 12. There is a plastic page 13 in the form of a plastic card and several paper pages 14 bound between the two cover halves 11 and 12. The cover side 11 contains a chip-coil configuration 15, 16 whereby personal data of a passport holder P are contained in the chip 15, and the coil 16 acts as an interface to a reader device 20. The personal data include typical passport data such as particularly name, address, birth date, etc. of a passport holder P. Further, biometric features of the passport holder P such as a fingerprint and/or retinal scan are stored in the chip 15 as personal data.

A photograph 17 and clear-text personal data 18 of the passport owner are applied to the plastic page 13. Further, the page 13 contains a field 19 with special machine-readable data that serve to check the validity of the passport booklet. The field 19 typically is in the form of a conventional, so-called MRZ (machine-readable zone).

The structure of the passport booklet 10 already described is known, and can, in an equally conventional manner, possess a number of deviations. Among other things, the chip-coil arrangement 14, 15 may be arranged on another page 12, 13, 14, or may possess another interface instead of a coil 16, such as an interface operating by direct contact. Further, additional fields may be provided on the plastic page 13, such as fields with a reproduction of biometric features such as a fingerprint, or additional fields with personal information. Also, the page 13 need not be of plastic, but rather may consist of any other material, particularly paper. The page containing the chip-coil arrangement 14, 15, i.e., the plastic page 13, the cover page 11, or another page 12, 15, is advantageously produced in the form of a chip card, or at least by using the manufacturing processes that are used to produce chip cards.

In a variant embodiment that is significant in practice, the passport booklet 10 may be reduced to a single page that is then preferably produced in the form of a chip card. This variant embodiment is particularly applicable to identification cards.

Figure 2:
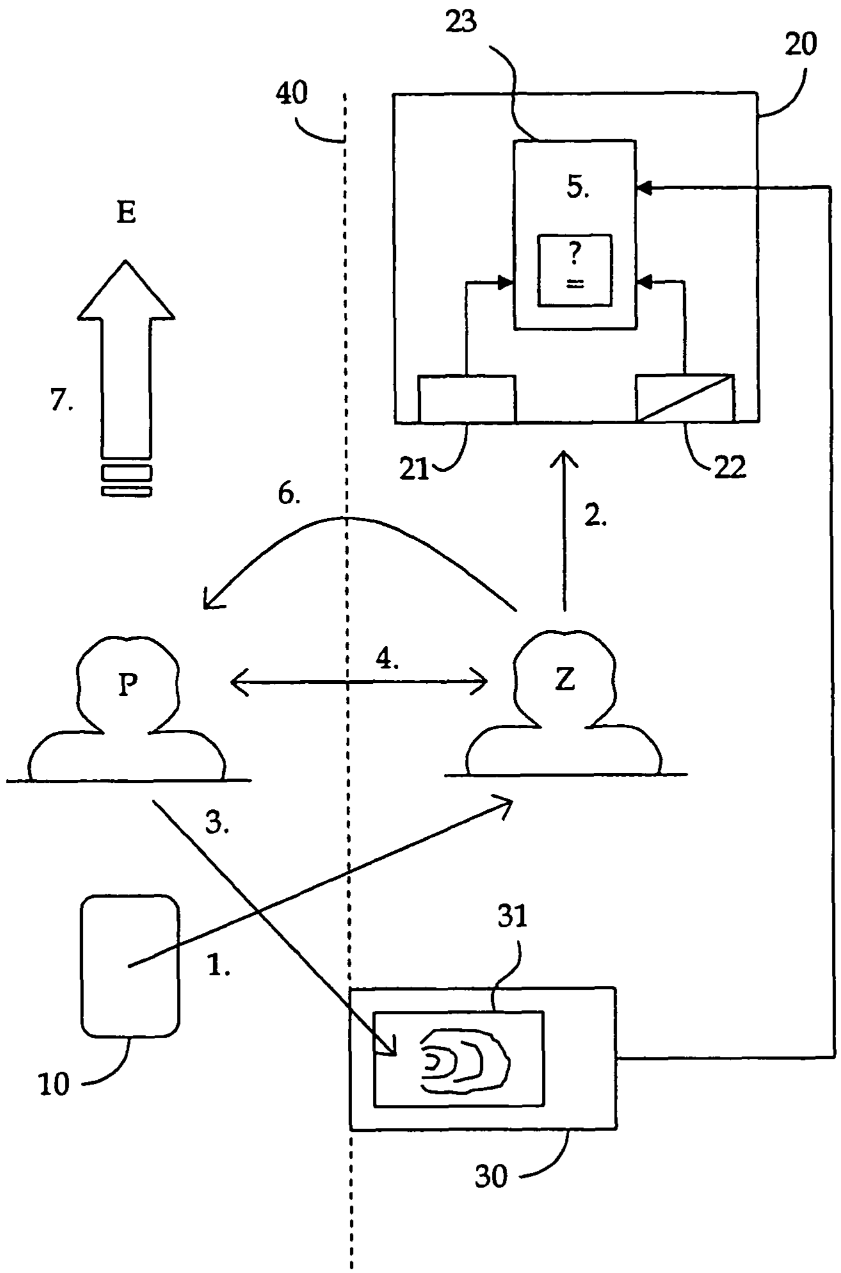
FIG. 2 illustrates a checking system to check an electronic passport.

FIG. 2 shows a checking system for checking an electronic passport and the interaction of the components involved. The system includes a passport booklet 10 hereafter simply called a passport, a reader device 20, and a device 30 connected with it to pick up a biometric feature of the person being checked, i.e., a passport booklet owner P.

The reader device 20 includes a device 21 to read the machine-readable data in the field 19 of a passport 10, an interface 22 to communicate with the coil 16 within the passport 10, and a central processing unit 23 connected with the device 21, the interface 22, and the pick up device 30. The central processing unit 23 particularly performs the data processing operations for checking the authenticity of a presented passport 10 and the legitimacy of a person P. Advantageously, the reader device 20 is not accessible to a person P whose passport 10 is to be checked, and is separated from him/her by a barrier 40. The components 21, 22, 23 of the reader device 20 may be arranged with spatial separation. Typically, the central processing unit 23 is spatially separated from the interfaces 21, 22. Advantageously, the interface 22 serves exclusively for data recording. The entire checking is performed within the central processor unit 23.

The pick up device 30 serves to pick up a biometric feature of a person P to be checked, and correspondingly includes suitable means to acquire a biometric feature. As FIG. 2 shows, the pick up device 30 may include, e.g., a fingerprint recorder 31. As an alternative or supplement, for example, a photographic camera may be provided. The pick up device 30 is accessible to the person P being checked.

An additional component of the checking system is a physically-present verifying person Z such as a border control officer or customs agent who visually checks the identity of the person P being checked.

The numbered arrows show the interaction of the components of the checking system. Herein, a person P being checked moves along direction E past the pick up device 30, the verifying person Z, and the reader device 20, from which he/she is physically separated by the barrier 40. As arrow 1 shows, the person P being checked, when passing through the checking system, first surrenders his/her passport 10 to the verifying person Z, who in turn presents the passport 10 per arrow 2 to the interfaces 21 and 22 of the reader device 20. During the time in which the passport 10 is read by the interfaces 21, 22, the person P being checked presents (arrow 3) a specific biometric feature such as his/her fingerprint to the pick up device 30, which converts the presented biometric feature into reference data and transmits them to the reader device 20. As soon as the data transfer from the passport 10 to the reader device 20 is complete, the verifying person Z takes the passport 10 from the reader device 20 and performs a visual inspection of the person P being checked. This visual inspection is typically performed by comparison of the person P with the photograph 17 in the passport 10.

During the visual inspection, the central processing device 23 evaluates the data obtained from the passport 10 via the interfaces 21 and 22 as well as the reference data provided by the pick up device 30. The result is communicated from the reader device 20 to the verifying person Z via suitable display means such as a display or colored lamps. If the result is positive, the reader device 20 shows an approving signal. The verifying person Z then returns the passport 10 to the person P being checked, after which the person P departs the checking system in the direction of arrow E. If the evaluation shows that the data read via the interfaces 21 and 22 from the passport 10 and the reference data transmitted by the pick up device 30 do not match, the reader device 20 shows an error notification.

Figure 3:
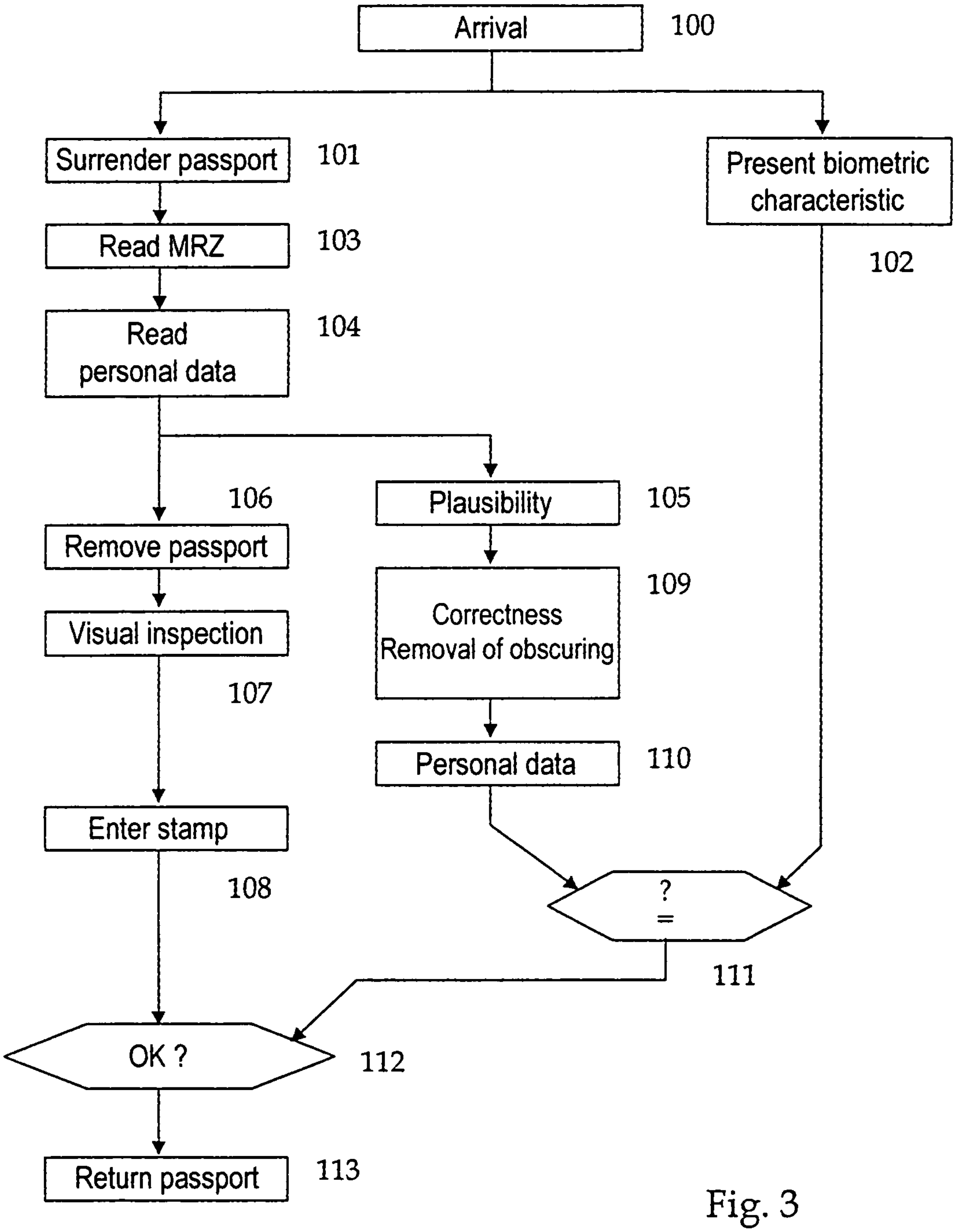
FIG. 3 is a flowchart showing the progression of the checking of an electronic passport.

FIG. 3 shows the steps to be performed in the course of checking a person P in the form of a flow chart. The checking process begins with the arrival of the person P to be checked at the checking system (step 100). The person P to be checked first surrenders his/her passport 10 to the verifying person Z (step 101). The person P being checked also presents a specific biometric feature to be presented to the pick up device 30 (step 102), which creates reference data from this and passes them on to the reader device 20.

The surrendered passport 10 is presented by the verifying person Z first to the interface 21, which reads out the machine-readable data from the field 19 (step 103). The verifying person Z then presents the passport 10 to the interface 22, where the personal data stored in the chip 14 are read (step 104).

Readout of the personal data is performed via a secured data connection. The securing is preferably, as described at the outset, achieved by means of "secure messaging" in connection with the use of send sequence counters SSCS. By means of encryption using the session keys and the send sequence counter, commands from the reader device 20 and responses from the passport 10 are obscured for data transmission.

The correct performance of this obscuring of the responses from a passport 10 is reviewed in the reader device 20. This review preferably occurs by means of a MAC (message authentication code) review. In this regard, the passport 10 forms a MAC for each obscured response, and the MAC is transmitted with the response to the reader device 20. After receipt of the response, the reader device 20 also creates a MAC* covering the obscured data, and compares the MAC* with the MAC transferred in the response of the passport 10.

Transfer of the data being read from the passport 10 occurs usually, as described at the outset, in several data packets.

According to the invention, it is provided that the readout of the data from the passport 10 and the review of validity of the obscuring process are no longer performed by the reader device 20 directly in data packets, but rather in a time-staggered manner, whereby first all data that are to be read out and are necessary for a check are completely transferred before the review of validity of the obscuring is performed.

Correspondingly, in step 104, only the complete readout of all data from the passport 10 occurs. The review of the validity of the obscuring and the recovery of the personal data, on the other hand, do not yet occur. Rather, after receipt of a data packet at the reader device 20, the next data packet is immediately requested from the passport 10. In order to nevertheless create a first assurance that the data read from the passport 10 were likely properly transmitted and that the passport 10 is authentic, a plausibility check of the data arriving at the reader device 20 occurs directly when reading out (step 105). During this step, it is checked whether the structure of the incoming data corresponds to a specific syntax. Further, it is checked whether the quantity of the transferred data matches an expected length. It may further be checked whether all expected data objects were transferred. If in step 105 the check finds that the acquired data are plausible, this is signaled to the verifying person Z by the reader device 20.

The verifying person Z then removes the passport 10 from the reader device 20 (step 106), and performs a visual inspection of the person P to be checked. This visual inspection preferably consists, in a conventional manner, of a comparison of the photograph 17 in the passport 10 with the person P. Additionally or alternatively to a visual inspection, additional activities may be performed by the verifying person Z. For example, the validity of a visa may be checked. Further, information may be entered into the passport 10 at this time, e.g., stamps may be entered into the pages 14 (step 108).

In parallel to the performance of the steps 106 and 107, the central processing unit 23 of the reader device 20 performs a review of the correctness and removes the obscuring of the data read from the passport 10 (step 109). For this, the central processing unit 23 first creates a MAC* for the acquired, obscured data, and checks whether it matches the MAC transferred in the response from the passport 10. If such is the case, it removes the obscuring by decryption of the acquired data and thereby recovers the personal data contained in the acquired data. The reader device 20 thus has access to the personal data stored in the passport 10 of the person P to be checked, which particularly contains biometrically checkable data such as the data of a fingerprint or a passport photograph (step 110).

The central processing unit 23 then reviews the biometrically checkable data for authenticity. For this, it compares the biometrically checkable data to the reference data that was in the meantime sent from the pick up device 30 to the central processing unit 23 after performance of step 102 (step 111). If the comparison in step 111 shows that the compared data from steps 110 and 102 match, the reader device 20 establishes authenticity and signals to the verifying person Z by means of a positive signal that the person P to be checked is entitled to pass.

If both the check in step 107 and the check in step 111 are successful (step 112), the verifying person Z finally returns the passport 10 to the person P to be checked (step 113).

If the compared data from steps 109 or step 111 do not match, the reader device 20 issues an error message.

With adherence to the fundamental concept of performing a check of a person based on personal data stored within a passport booklet whereby the personal data are first only read by a reader device, the passport is subsequently directly released, and the machine-based check of validity of the acquired personal data is performed in parallel to the performance of further check measures, the described invention allows for a number of configurations not described in detail. For example, it may be provided that recording of the biometric feature occurs at the pick up device 30 even before the passport 10 is surrendered to the verifying person Z for reading of the electronic data. This option is useful when lines of persons P to be checked regularly form. Likewise, the return of the passport 10 may occur before the check of biometrically checkable data is completed in step 111. The checking system may also include additional components without restriction, such as several pick up devices to pick up different biometric features, or selection devices by means of which the verifying person Z may select one biometric feature from the various ones offered, which is then evaluated in the central processing unit 23. Further, instead of using the technique of secure messaging, another technique may be used to obscure the data transfer between passport 10 and reader device 20. Likewise, techniques other than the use of MACs may be used to verify the correct performance of the obscuring.

The invention claimed is:

1. A method for machine checking of personal data stored electronically in a passport booklet, comprising:

upon presentation of the passport booklet at a reader device, the passport booklet obscuring the personal data to obtain obscured personal data, and transferring the obscured personal data to the reader device using a key that is negotiated between the passport booklet and the reader device, wherein the transfer of the obscured personal data to the reader device comprises a plurality of responses from the passport booklet, and wherein, for each response in the plurality of responses, the passport booklet forms a first message authentication code MAC, and transmits the first message authentication code MAC in the response to the reader device, the reader device performing a plausibility check of the obscured personal data arriving at the reader device, the reader device checking the obscuring in the received obscured personal data for correctness, wherein, for each response in the plurality of responses, the reader device generates a second message authentication code MAC*, and compares the generated second message authentication code MAC* with the first message authentication code MAC transferred in the response, and wherein the reader device performs the plausibility check prior to the checking of the obscuring for correctness, if the correctness of the obscuring is confirmed, removing the obscuring from the obscured personal data, thus obtaining recovered personal data, checking the recovered personal data for authenticity, and, upon successful checking of the recovered personal data for authenticity, issuing a positive signal, wherein the checking of the obscuring for correctness and the removal of the obscuring and the authenticity check occur only after all personal data to be read from the passport booklet are completely transferred to the reader device.

2. The method according to claim 1, wherein the removal of the obscuring and the authenticity check occur only after the passport booklet has been removed from the reader device.

3. The method according to claim 1, wherein the plausibility check is performed by means of a check of whether the data transferred to the reader device possess a specific syntax.

4. The method according to claim 3, wherein the removal of the obscuring and the authenticity check occur only after the passport booklet has been removed from the reader device.

5. The method according to claim 1, wherein the plausibility check is performed by means of a check of whether the data received at the reader device match a specific, anticipated quantity.

6. The method according to claim 5, wherein the removal of the obscuring and the authenticity check occur only after the passport booklet has been removed from the reader device.

7. The method according to claim 1, wherein the obscuring of the personal data is performed by application of the technique of Secure Messaging during transfer to the reader device.

8. The method according to claim 1, wherein the authenticity check is performed by comparison of the recovered personal data with reference data picked up on the spot.

9. The method according to claim 8, wherein the personal data accessed for the authenticity check and the reference data are biometric data.

10. The method according to claim 1, wherein the transfer of the personal data occurs only after machine-readable data have previously been read from the passport booklet.

11. The method according to claim 1, wherein the personal data are stored in the passport booklet within a chip, and may be accessed without direct contact via a coil connected to the chip.

12. The method according to claim 1, wherein the personal data are stored in the passport booklet within a chip, and may be accessed via a contact-based interface connected with the chip.

13. A reader device with an interface for reading electronically-stored personal data from a passport booklet and a central processing device for checking correctness and authenticity of read-out data, wherein the central processing device checks personal data that are acquired in a plurality of responses from the passport booklet upon receipt for plausibility, but performs the correctness and authenticity checks of the read-out data only after the passport booklet has been removed from the interface, wherein the correctness check comprises, for each response in the plurality of responses, generating a reader device message authentication code MAC*, and comparing the generated reader device message authentication code MAC* with a passport booklet message authentication code MAC that is received in the response.

14. The checking device according to claim 13, wherein the interface for reading the data from a passport booklet is spatially separated from the central data processing device, and the checking of the read-out data occurs completely within the central data processing device.

* * * * *